(12) United States Patent
Rowse et al.

(10) Patent No.: US 6,178,728 B1
(45) Date of Patent: Jan. 30, 2001

(54) DUAL IMPLEMENT HITCH

(76) Inventors: Dan D. Rowse, 2315 N., Ord, NE (US) 68862; Ron A. Rowse, HC 80, Box 43, Burwell, NE (US) 68823

( * ) Notice: Under 35 U.S.C. 154(b), the term of this patent shall be extended for 0 days.

(21) Appl. No.: 09/303,954

(22) Filed: May 3, 1999

(51) Int. Cl.[7] .............................. A01D 80/00; A01B 63/00
(52) U.S. Cl. ................................ 56/15.5; 172/248
(58) Field of Search ..................... 56/14.3, 14.9, 56/15.5, 15.4; 172/248, 310, 311, 313, 383, 625, 314, 385; 280/412, 413, 473, 411.1

(56) References Cited

U.S. PATENT DOCUMENTS

| | | |
|---|---|---|
| 2,756,654 | 7/1956 | Porterfield, Jr. et al. . |
| 3,675,945 | 7/1972 | Fischer . |
| 3,893,283 | 7/1975 | Dandl . |
| 3,981,366 | 9/1976 | Van Der Lely et al. . |
| 4,113,273 | 9/1978 | Gates . |
| 4,178,010 * | 12/1979 | Gerber ................................. 280/412 |
| 4,213,628 * | 7/1980 | Hardesty ............................. 280/412 |
| 4,329,833 | 5/1982 | Witzel . |
| 4,682,462 * | 7/1987 | Johnson, Sr. ........................... 56/228 |
| 4,723,402 | 2/1988 | Webster et al. . |
| 4,821,811 | 4/1989 | Swenson . |
| 4,875,527 | 10/1989 | Foley et al. . |
| 5,025,616 | 6/1991 | Moss . |
| 5,261,497 * | 11/1993 | Snyder et al. ........................ 172/313 |
| 5,265,898 * | 11/1993 | Houck .................................. 280/413 |
| 5,412,929 | 5/1995 | Urbain et al. . |
| 5,544,475 | 8/1996 | Skibo . |
| 5,713,192 | 2/1998 | Robinson . |
| 5,720,352 | 2/1998 | Tharaldson . |

* cited by examiner

*Primary Examiner*—Robert E. Pezzuto
(74) *Attorney, Agent, or Firm*—Zarley, McKee, Thomte, Voorhees & Sease

(57) ABSTRACT

A pair of implements such as hay windrow fluffers are interconnected by a hitch assembly allowing for positioning the fluffers in a side-by-side field position or trailing transport position. A tongue assembly on the second implement is connected to the tongue assembly on the first implement when the implements are in a field position. An extendable linkage interconnects the implements and extends laterally when the implements are in a field position and parallel to the line of travel when the implements are in the transport position. The linkage has vertical posts at opposite ends which connect to the tongue assemblies of the implements to allow the linkage to extend over the front first implement when in the transport position.

14 Claims, 7 Drawing Sheets

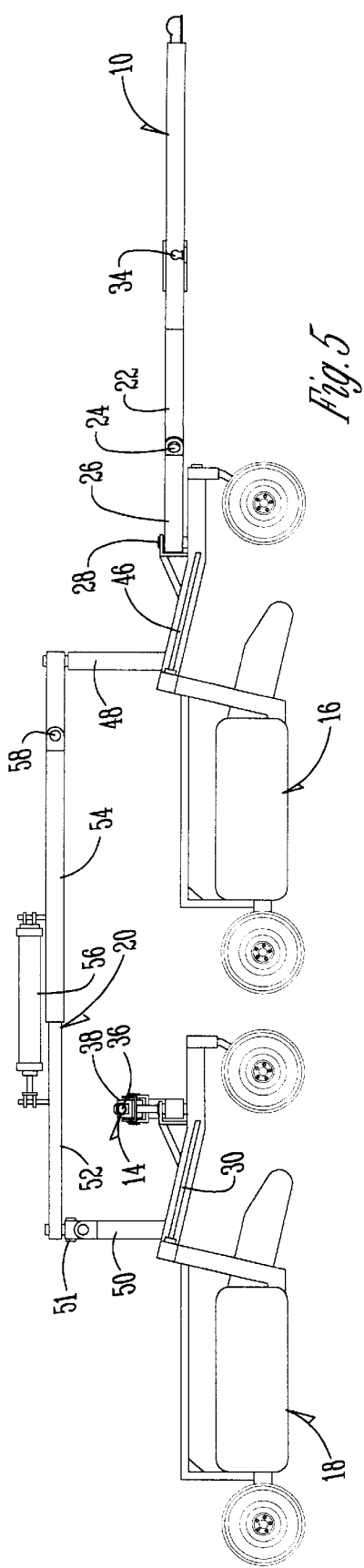
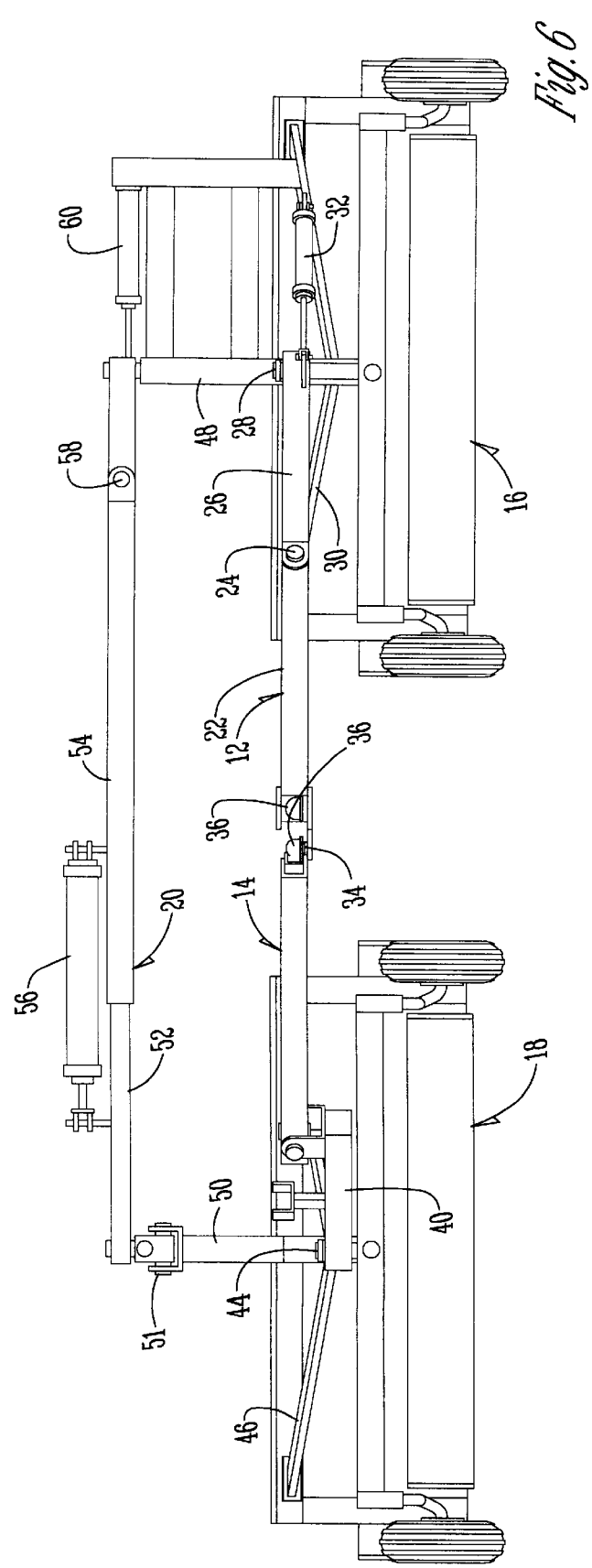

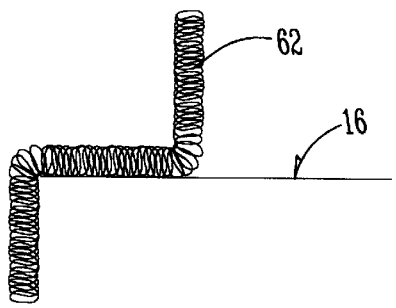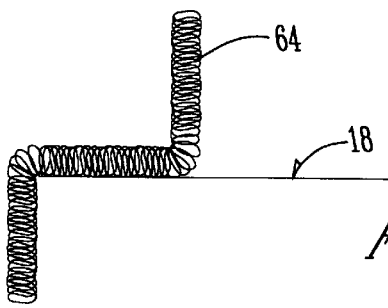
Fig. 8
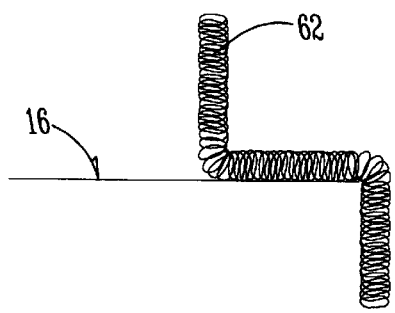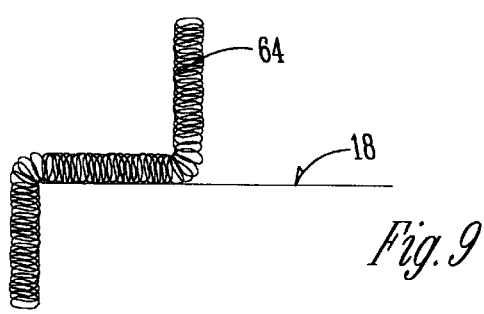
Fig. 9
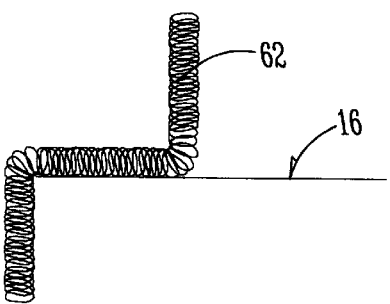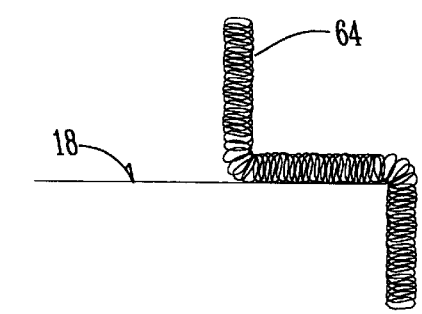
Fig. 10
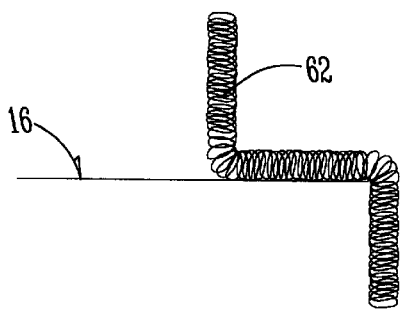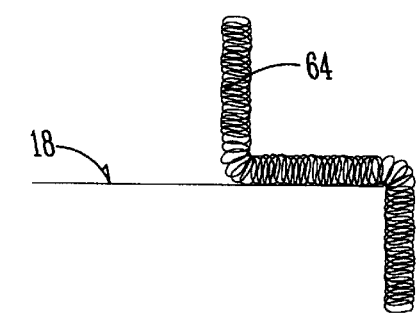
Fig. 11

DUAL IMPLEMENT HITCH

BACKGROUND OF THE INVENTION

A farm implement can only be so wide and still be manageable in traveling between fields including use of public highways. Thus, multiple implements will be hitched in side-by-side relationship for field use and then positioned one behind the other for transport. There are many complicated hitch arrangements that address this need, but they suffer from being overly complex in structure and operation. What is needed is a simplified hitch that will readily allow a pair of implements to be quickly moved between a side-by-side field position and a trailing transport position.

SUMMARY OF THE INVENTION

Each of a pair of implements have a tongue assembly and a link extends between the implements connecting them together and pivots from a laterally extending position when the implements are in a field position to a position parallel to the line of travel when the implements are in a transport position. The link has posts at opposite ends which connect to the tongue assemblies of the implements. The link is telescopically extendable and has a hinge allowing the second implement to follow the contour of the land in both field and transport positions.

The tongue assembly of the second implement is pivotable between a forwardly extending position where it is connected to the tongue assembly of the first implement when the implements are in the field position to a laterally extending storage position when the implements are in a transport position.

The tongue assemblies of both the first and second implements have hinges allowing the implements to follow the contour of the ground when the implements are in the field position.

While the hitch assembly of this invention is suitable for implements performing a wide variety of different functions, it is particularly suitable for use with hay rake equipment, such as windrow fluffers. Windrow fluffers in the tandem side-by-side field position may each receive a windrow of hay and selectively discharge the hay into separate rows to the left, to the right, to the center, to the left and right, and to combine two or more windrows for harvesting two windrows at the same time

BRIEF DESCRIPTION OF THE DRAWINGS

FIG. 5 is a side elevational view of the fluffer implements taken along line 5—5 in FIG. 2.

FIG. 6 is a front end elevational view of the fluffer implements taken along line 6—6 in FIG. 4.

FIG. 8 is a top plan view of the two windrows of hay having both been discharged to the left.

FIG. 9 is a view similar to FIG. 8 but showing the hay windrows both being discharged to the center between the implements combining the two windrows for harvesting at the same time.

FIG. 10 is a view similar to FIG. 8 but showing the hay windrows both being discharged outwardly in opposite directions.

FIG. 11 is a view similar to FIG. 8 but showing the hay windrows both being discharged to the right.

DETAILED DESCRIPTION OF THE INVENTION

Figure 4:
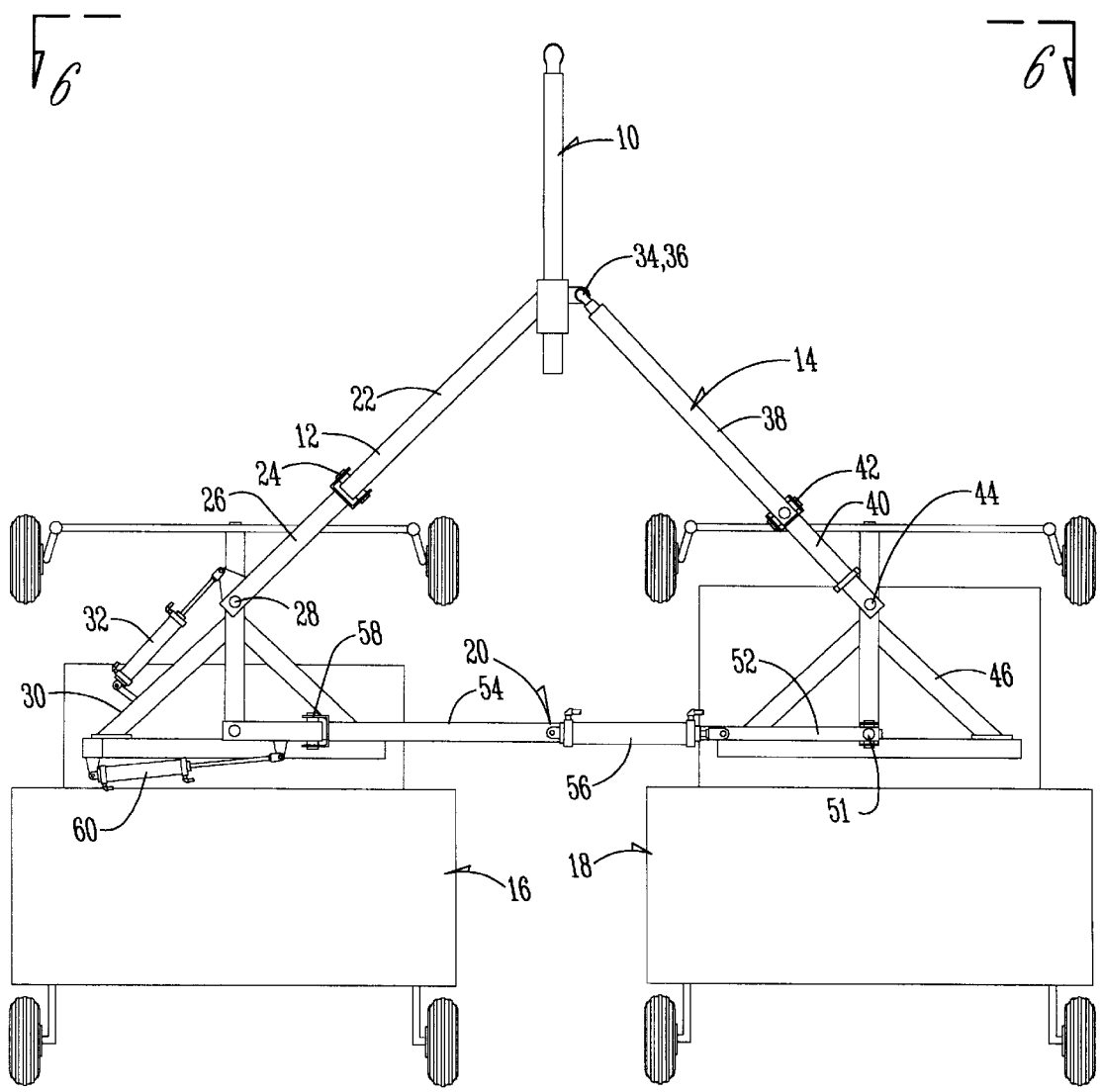
FIG. 4 is a top plan view of the hay fluffer implements in their field position with the tongue assemblies of the implements interconnected.

The hitch assembly of this invention is referred to generally by the reference numeral 10 in FIG. 4 and includes individual tongue assemblies 12 and 14 for windrow fluffers 16 and 18 respectively. A link assembly 20 interconnects the implements 16 and 18 through the tongue assemblies 12 and 14.

Figure 3:
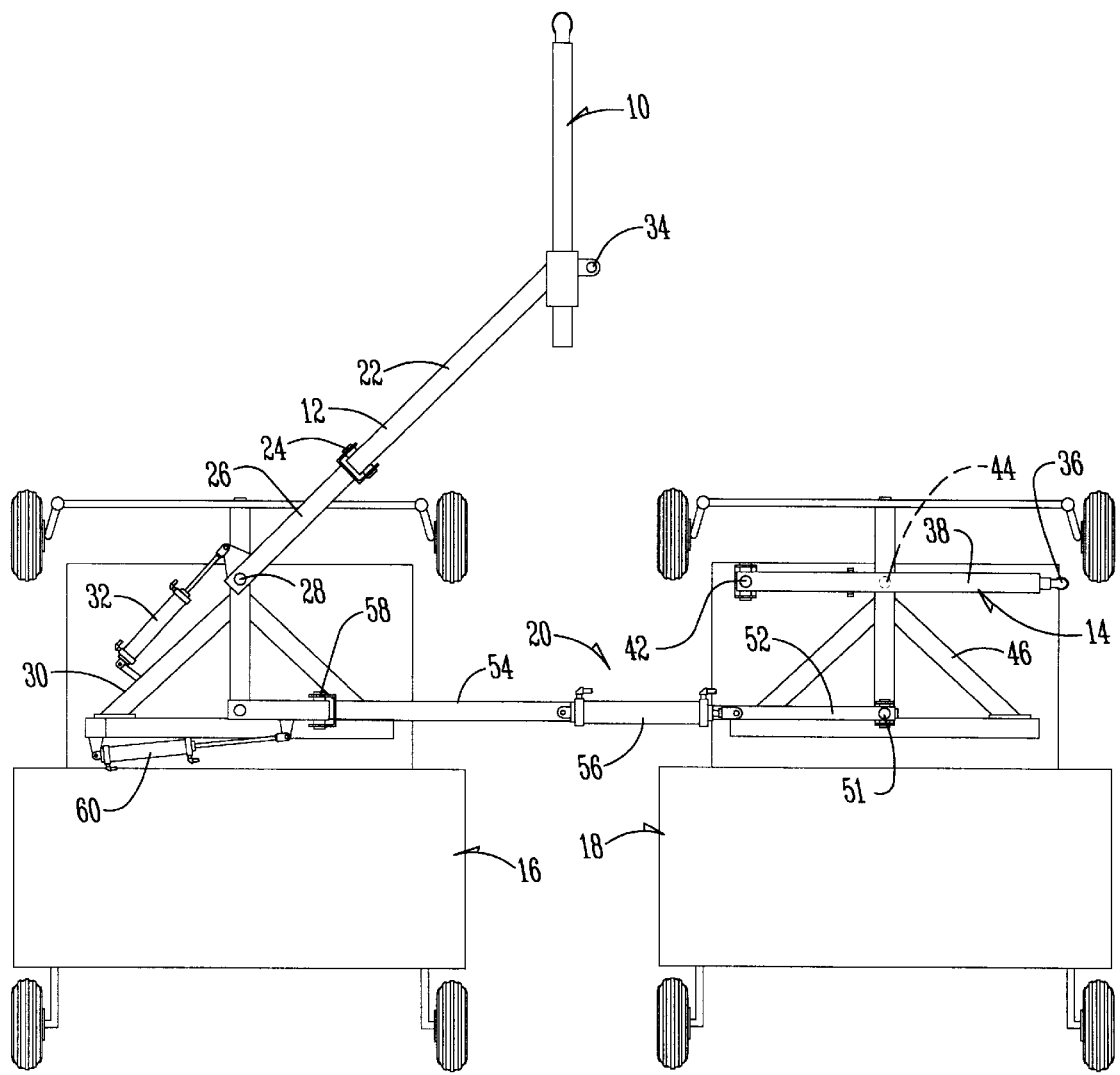
FIG. 3 is a top plan view of a fluffer implement in a side-by-side field position prior to the tongue assembly of the second implement being connected to the tongue assembly of the first implement.

The tongue assembly 12 includes a forward section 22 pivotally interconnected through a hinge 24 to a rear section 26 in turn pivotally connected at 28 to a frame 30. A hydraulic cylinder 32 connected to the frame 30 is connected to the rear tongue section 26 for pivoting the tongue assembly 12 between the field position of FIG. 3 and the transport of FIG. 1.

The forward section 22 of the tongue assembly 12 further includes a ball-type connector 34 to which a socket 36 on the forward end of the forward section 38 of the second implement tongue assembly 14 is connected. A rear section 40 is pivotally connected through a hinge 42 to the forward section 38. The rear section 40 is in turn pivotally connected at 44 to a frame 46 of the second implement 18.

The link assembly 20 includes at its opposite ends vertical posts 48 and 50 connected to the frames 30 and 46 and as seen in FIG. 5 extends over the front implement 16 when the implements are in the trailing transport position.

Figure 1:
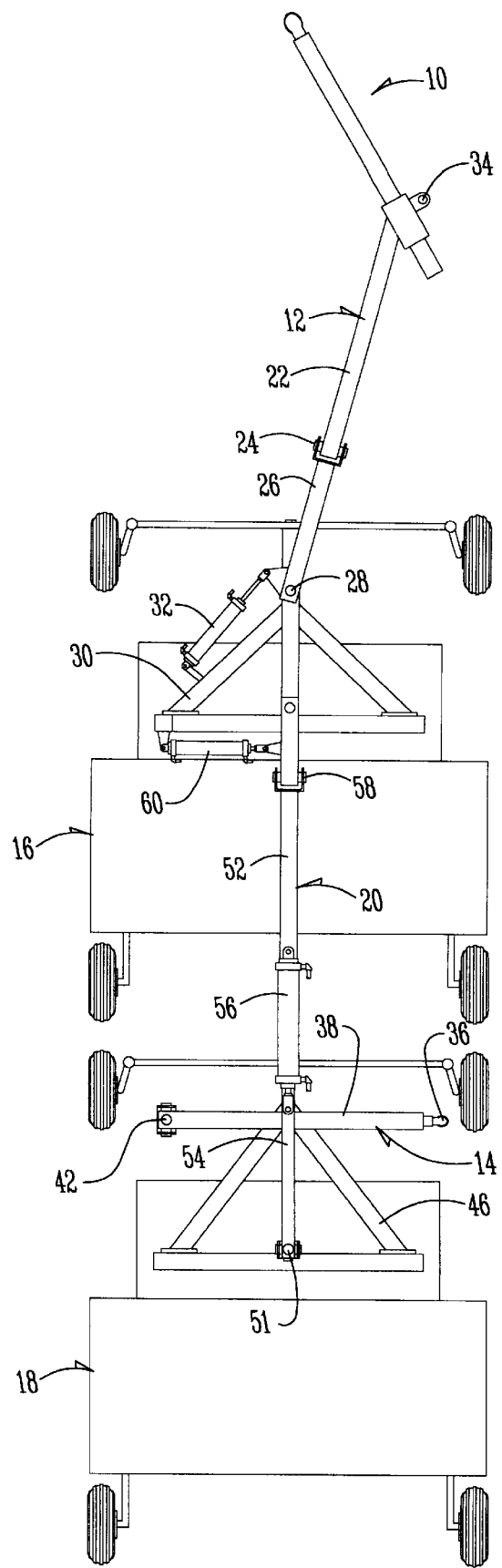
FIG. 1 is a top plan view of the hitch assembly of this invention used with a pair of fluffer implements and showing them in a trailing transport position.
Figure 2:
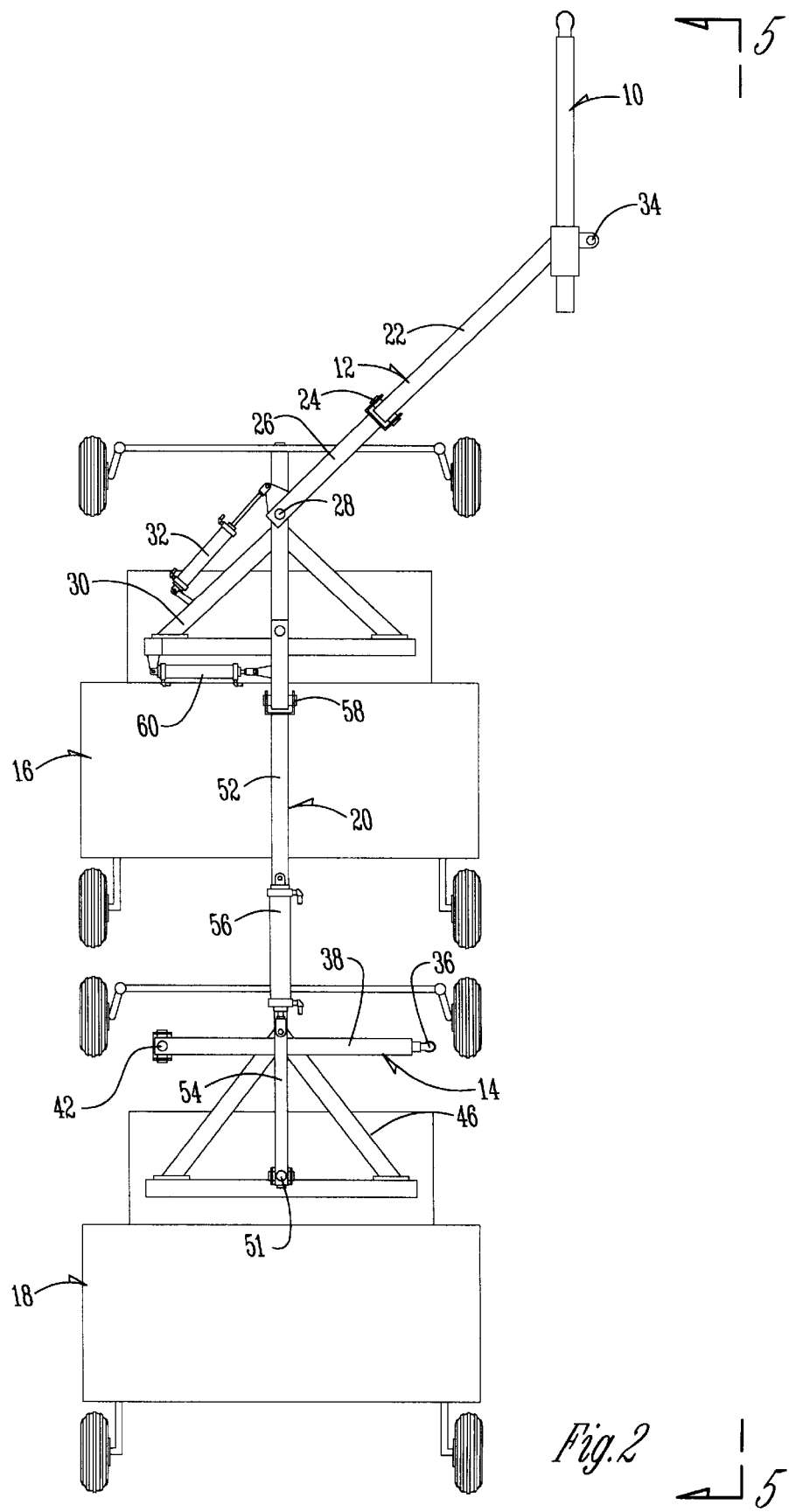
FIG. 2 is a view similar to FIG. 1 but showing the tongue assembly of the first implement pivoted to the right to a position to engage the tongue assembly of the second implement when moved into a field position.
Figure 7:
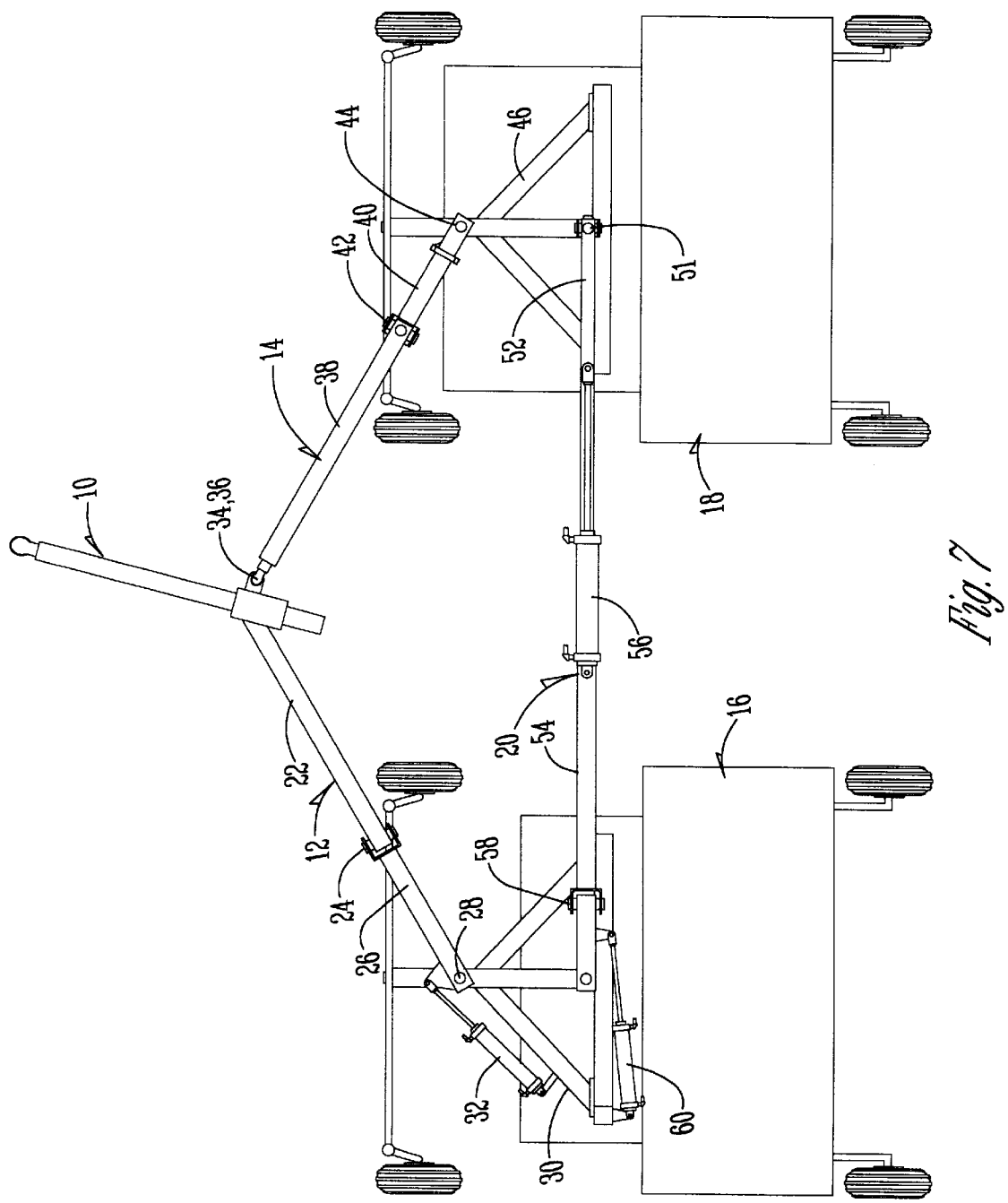
FIG. 7 is a top plan view similar to FIG. 4 but showing the link assembly having been extended for increasing the space between the implements in their field position.

The link assembly 20 includes a pair of telescopic members 52 and 54 interconnected by a hydraulic cylinder 56 which allows for varying the distance between the implements 16 and 18 when in both their field and transport positions as shown in FIGS. 1, 4 and 7. The link member 54 includes a pivot hinge 58 which allows the trailing implement 18 to follow the contour of the ground when either in the field or transport position. A hydraulic cylinder 60 is connected between the frame 30 of the first implement 16 and the link member 52 of the link assembly 20 for pivoting the link assembly and in turn the implement 18 between the field position of FIG. 4 and the transport position of FIG. 1. The implement 18 is able to pivot through a three-way hinge 51 interconnecting the link member 52 to the post 50 and thereby move freely without restriction over the ground.

It is thus seen in operation that the three hydraulic cylinders 32, 56 and 60 allow for moving the implement 18 between the field position of FIG. 4 and the transport position of FIG. 1. The hydraulic cylinder 32 positions the tongue assembly 12 of the implement 16 in the range of positions shown in FIGS. 1, 4 and 7. The hydraulic cylinder 60 connected to the link assembly 20 pivots the implement 18 from the side-by-side position to the trailing position while the hydraulic cylinder 56 is operated to provide the desired spacing between the implements 16 and 18.

When the implement 18 is in the transport position of FIG. 1 the tongue assembly 14 is folded into a storage position with the forward section 38 laying on top of the rearward section 40.

In FIGS. 8–11 the windrow fluffers 16 and 18 can be operated to direct windrows 62 and 64 to any desired position among a number of options as illustrated.

What is claimed is:

1. A dual implement hitch assembly interconnecting and positioning two implements in a side-by-side field position and a trailing transport position comprising, first and second implements each having a tongue assembly, a link assembly interconnecting said first and second implements for positioning said first and second implements in said field and transport positions, said first implement tongue assembly including a tongue member pivotally connected to a frame and extending forwardly therefrom and being pivotable between first and second positions, said first position being when said first and second implements are in said field position and said second position when they are in said transport position, said second implement tongue assembly including a tongue member pivotally connected to a frame on said second implement and extending forwardly therefrom for connection to said first implement tongue assembly when said implements are in said field position, said link assembly extending laterally between said implements in said field position and extending parallel to the line of travel when said implements are in said transport position, said link assembly including elongated vertically aligned members forming a single straight line connection between said first and second implements in a horizontal plane.

2. The dual implement hitch of claim 1 wherein a hydraulic cylinder extends between said frame of said first tongue assembly and said tongue member thereof to pivot said tongue member between said first and second positions.

3. The dual implement hitch of claim 1 wherein said aligned members include telescopic members and a hydraulic cylinder for extending and contracting said link assembly to vary the horizontal spacing between said implements in said field and transport positions.

4. The dual implement hitch of claim 1 wherein said link assembly includes vertical posts at opposite ends on the frames of said implements to position said link assembly above said first implement when said implements are in said transport position.

5. The dual implement hitch of claim 4 wherein said link assembly includes a pair of link members pivotally interconnected about a horizontal axis to allow said second implement to follow the contour of the ground when said implements are in said field and transport positions.

6. The dual implement hitch of claim 1 wherein said tongue member of said second implement tongue assembly includes a first section having opposite ends, one of said ends being pivotally connected to said frame so as to allow pivoting of said tongue member into a laterally extending position with respect to said frame of said second implement when in said transport position.

7. The dual implement hitch of claim 6 wherein said tongue member includes a second section pivotally connected to the other end said ends of said first section about a horizontal axis so as to allow said second section to be folded into a vertically overlapping relationship with said first section in said transport position.

8. The dual implement hitch of claim 1 wherein the link assembly extends perpendicular to the line of travel when said implements are in said field position.

9. A dual implement hitch assembly interconnecting and positioning two implements in a side-by-side field position and a trailing transport position comprising, first and second implements each having a tongue assembly, a link assembly interconnecting said first and second implements for positioning said first and second implements in said field and transport positions, said first implement tongue assembly including a tongue member pivotally connected to a frame and extending forwardly therefrom and being pivotable between first and second positions, said first position being when said first and second implements are in said field position and said second position when they are in said transport position, said second implement tongue assembly including a tongue member pivotally connected to a frame on said second implement and extending forwardly therefrom for connection to said first implement tongue assembly when said implements are in said field position, said link assembly extending laterally between said implements in said field position and extending parallel to the line of travel when said implements are in said transport position, said tongue member of said first implement tongue assembly including a forward section having a pivotal coupling means thereon, said tongue member of said second implement tongue assembly including a forward section distinct from said linking assembly, said forward section having a pivotal coupling means thereon detachably coupled with said coupling means on said first implement tongue assembly in said field position and uncoupled therefrom in said transport position.

10. The dual implement hitch of claim 7 wherein said pivotal coupling means on said second implement tongue assembly is a ball hitch socket and said pivotal coupling means on said first implement tongue assembly is a trailer ball hitch.

11. A dual implement hitch assembly interconnecting and positioning two implements in a side-by-side field position and a trailing transport position comprising, first and second implements each having a tongue assembly, a link assembly interconnecting said first and second implements for positioning said first and second implements in said field and transport positions, said first implement tongue assembly including a tongue member pivotally connected to a frame on said first implement and extending forwardly therefrom and being pivotable between first and second positions, said first position being when said first and second implements are in said field position and said second position when they are in said transport position, said second implement tongue assembly including a tongue member pivotally connected to a frame on said second implement and extending forwardly therefrom for connection to said first implement tongue assembly when said implements are in said field position, said link assembly extending laterally between said implements in said field position and extending parallel to the line of travel when said implements are in said transport position, and said link assembly including opposite ends, one of the ends being pivotally connected to said frame of said first implement by a vertical riser post of sufficient height such that said link assembly is elevated above said first implement thereby allowing said link assembly to swing above said first implement to move said implements between said field position and said transport position.

12. The dual implement hitch assembly of claim 11 wherein said link assembly extends above a central portion of said first implement in said transport position.

13. The dual implement hitch assembly of claim 11 wherein another of said ends of said link assembly is pivotally connected by a vertical riser post to said frame of said second implement.

14. The dual implement hitch assembly of claim 11 wherein said implements each have a central axis that is parallel to the line of travel, said link assembly having a central longitudinal axis that resides in a common vertical plane with said central axis of each of said implements when said implements are in said transport position.

* * * * *